W. L. JONES.
TRAP.
APPLICATION FILED AUG. 8, 1914.

1,177,522.

Patented Mar. 28, 1916.
2 SHEETS—SHEET 1.

Inventor
W. L. Jones,
By Victor J. Evans
Attorney

Witnesses

W. L. JONES.
TRAP.
APPLICATION FILED AUG. 8, 1914.

1,177,522.

Patented Mar. 28, 1916.
2 SHEETS—SHEET 2.

Inventor
W. L. Jones,
By Victor J. Evans
Attorney

Witnesses
C. F. Rudolph
J. W. Garner

UNITED STATES PATENT OFFICE.

WILL L. JONES, OF DOUGLAS, ARIZONA.

TRAP.

1,177,522.   Specification of Letters Patent.   Patented Mar. 28, 1916.

Application filed August 8, 1914.   Serial No. 855,763.

*To all whom it may concern:*

Be it known that I, WILL L. JONES, a citizen of the United States, residing at Douglas, in the county of Cochise and State of Arizona, have invented new and useful Improvements in Traps, of which the following is a specification.

This invention is an improved trap for catching rats and other animals, the object of the invention being to provide an improved trap, the parts of which are so constructed and arranged as to cause the trap to be set by one victim for catching another so that the trap when initially set may catch a number of victims in succession.

The invention consists in the construction, combination and arrangement of devices hereinafter described and claimed.

Figure 1:
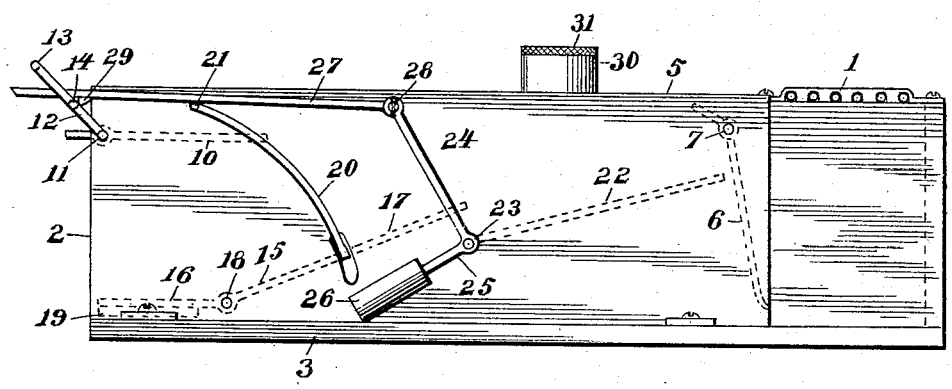
Figure 2:
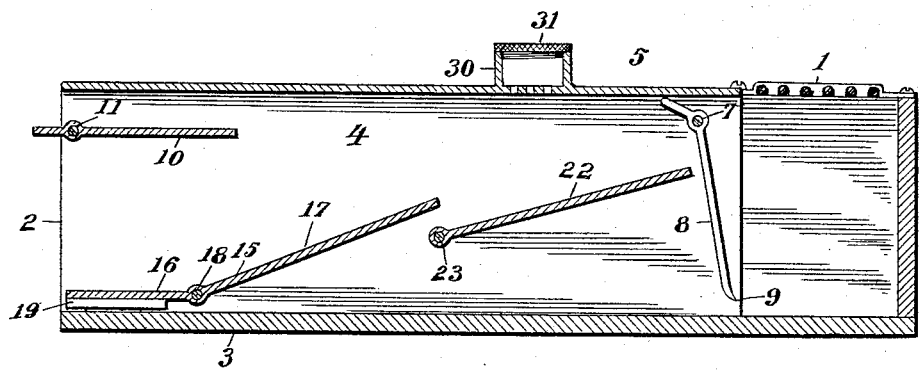
Figure 3:
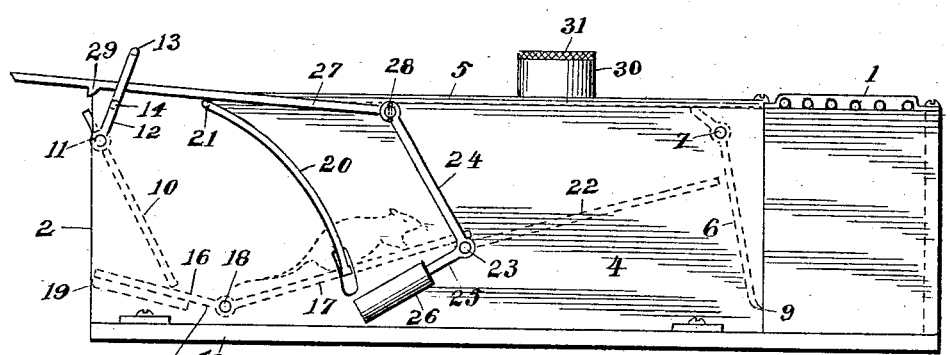
Figure 4:
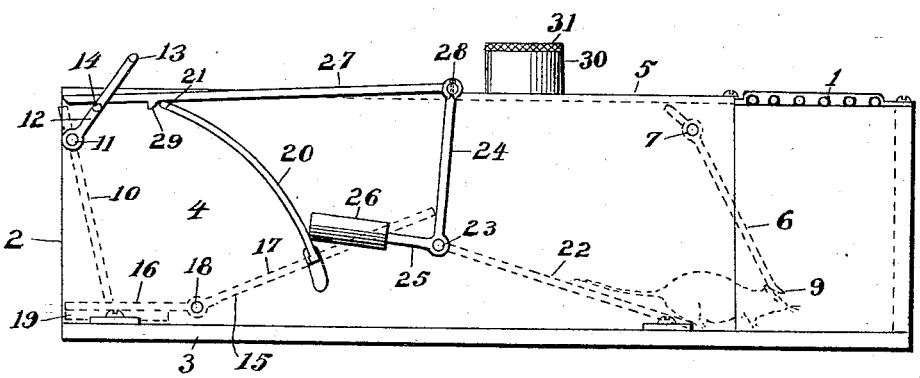

In the accompanying drawings:—Figure 1 is a side elevation of a trap constructed in accordance with my invention showing the same in initial set position, the door, fall, and primary and secondary treads being indicated in dotted lines. Fig. 2 is a vertical sectional view of the same in the same position. Fig. 3 is an elevation of the same with the interior parts indicated in dotted lines and in the position assumed thereby while an animal is in the trap. Fig. 4 is a similar view and with the parts in the position assumed while the animal is leaving the trap.

In accordance with my invention I provide a cage or runway to receive the victims as caught. This cage or runway may be of any suitable construction and is here indicated at 1. A passage leads to the runway and is here indicated at 2 and as composed of a base or floor 3, a pair of spaced walls 4 and a top 5. The passage is open at its ends and at its rear end which communicates directly with the runway or cage 1, is a fall or door 6 which is pivotally mounted as at 7 and is adapted by gravity to arrange itself in vertical closed position. This fall is shown as having vertical bars 8 the lower ends of which are pointed as at 9.

At the front end of the passage is a door 10 which is pivotally mounted near its upper side between the walls 2 and has a pivot shaft 11 which is provided at one end, on the outer side of the passage, with an arm 12 which is at an angle to the door and is provided on one side with a guide 13 the lower side of which forms a tappet 14. This door is adapted to close downwardly by gravity.

A primary tread 15 is arranged in the passage, and comprises a pair of angularly related members 16—17 and pivots 18 at the angle between said members, said pivots being mounted in bearing openings in the walls 2. The member 16 of the primary tread is directly below the door 10 and has a weight 19 to cause said member, which is the shorter, to somewhat more than counterbalance the member 17 so that normally the member 16 will be horizontal and the member 17 will be arranged in an inclined position, extending upwardly and rearwardly in the passage. On one side of the primary tread and arranged on the same side of the passage with the arm 12 is a trip arm 20 which has a tappet 21 at its free end, at right angles or substantially so thereto.

In rear of the primary tread 15 is a secondary tread 22 which is pivotally mounted in the side walls of the passage as at 23 and the pivot shaft of which has an arm 24, on the same side of the passage as the arm 12 and is also provided with an arm 25 which carries a weight 26. This weight normally serves to elevate the secondary tread and hold the latter in inclined position, extending upwardly and rearwardly in the rear portion of the passage and immediately in front of the fall 6. A setting rod 27 is pivotally connected as at 28 to the arm 24 and is arranged to slide in the guide 13 of the arm 12 and has near its front end, on its lower side, a shoulder or stop 29 to engage the stop 14 which forms the lower side of said guide.

When the trap is in initial position as indicated in Fig. 1 with the door 10 open, the fall 6 closed, the primary tread 15 in position with its element 16 lowered and its element 17 raised and the secondary tread 22 also in raised position, with the weight 26 lowered. the stop 29 of the setting rod is engaged with the stop 14 of the arm 12 and the free end of the trip arm 20 is just under the latter to slide rearwardly of the setting rod.

In the top of the trap is a bait receiver 30 in which suitable bait. such as cheese may be placed and a plug 31 is provided to close the bait receiver. This location of the bait in the upper portion of the trap and between the ends of the passage prevents the smell of the bait from being noticed at the sides of the trap but permits it to be manifested with particular strength at the entrance to the passage so that the bait strongly induces an animal to enter the passage. As it does so the animal necessarily passes under the door 10 and steps on the primary tread. As it passes rearwardly on the primary tread to reach the bait its weight on the rear portion of the primary tread turns the latter on its pivot 18 and at such turning movement of the primary tread its trip arm 20 is caused to move upwardly and rearwardly under the setting rod and to raise the free end of the latter so that the stop 29 of the setting rod becomes disengaged from the stop 14 of the arm 12, thus releasing the door 10 and the latter drops by its own weight behind the animal so that he cannot return. The animal can only pass rearwardly and as he does so he steps from the primary tread on to the secondary tread, overturning the latter and causing the arm 24 thereof to draw the setting rod 27 rearwardly so as to reëngage its stop 29 with the stop 14 and thus again connect said setting rod with the arm 12. Such movement of the secondary tread under the weight of the animal causes the weight 26 to be raised, as will be understood, and as indicated in Fig. 3. The animal can then only get out of the passage by passing under the fall 6. As he does so the points 9 of the fall prevent the animal from backing or returning and as he leaves the secondary tread when passing under the fall the weight 26 again raises the secondary tread and as it does so causes the arm 24 to thrust the setting rod 27 forwardly so that said setting rod in coaction with the stops 29—14 and the arm 12 causes the door 10 to be again opened, thus setting the trap for another victim. Only one animal can be in the passage at a time and when he once passes under the door 10 he cannot return.

Having thus described my invention, I claim:—

1. In a trap of the class described having an elongated passage, a tread having pivotal connection with the side walls of the passage, a tripping arm connected with the tread and arranged exteriorly of the passage, a second tread having pivotal connection with the side walls of the passage beneath the rear end of the first mentioned tread to limit the swinging movement thereof, a shaft journaled in the side walls of the passage, a door disposed in the entrance to said passage and connected with the shaft, an arm extending at an angle from said shaft exteriorly of said passage and provided with an elongated guide way, a setting rod having one end disposed in said guide way and contacting with the tripping arm, a lug extending from the under side of the setting rod for contact with the lower end of the guide way, a weighted lever connected with the pivotal connection of the second mentioned tread and the other end of the setting rod for moving said door to an open position when the second mentioned tread is actuated, and an angularly arranged front portion on the first mentioned tread disposed beneath said door and coacting therewith when said door is in closed position to provide a closure for said passage.

2. In a trap of the class described provided with an elongated passage, a tread having pivotal connection with the side walls of the passage and provided with angularly related front and rear portions, a tripping arm connected with the tread, a second tread having pivotal connection with the side walls of the passage beneath the rear end of the first mentioned tread to limit the swinging movement thereof, a shaft journaled in the side walls of the passage, an arm extending at an angle from said shaft exteriorly of said passage and provided with an elongated guide way, a setting rod having one end disposed in said guideway and contacting with the tripping arm, a lug extending from the under side of the setting rod, a weighted lever secured to the pivotal connection of the second mentioned tread and pivotally connected with the other end of the setting rod for communicating sliding movement thereto, and a door disposed in the entrance to said passage and secured to the shaft, said door being adapted to normally coact with the weighted end of the lever for holding the lower end of the guide way on said arm in contact with the lug on the setting rod whereby said door may be held in raised position.

In testimony whereof I affix my signature in presence of two witnesses.

WILL L. JONES.

Witnesses:
A. O. DUNAWAY,
GEO. F. GRAY.

Copies of this patent may be obtained for five cents each, by addressing the "Commissioner of Patents, Washington, D. C."